United States Patent
Gray et al.

(10) Patent No.: US 8,229,907 B2
(45) Date of Patent: Jul. 24, 2012

(54) HARDWARE ACCELERATED TRANSACTIONAL MEMORY SYSTEM WITH OPEN NESTED TRANSACTIONS

(75) Inventors: Jan Gray, Bellevue, WA (US); Martin Taillefer, Redmond, WA (US); Yosseff Levanoni, Redmond, WA (US); Ali-Reza Adl-Tabatabai, San Jose, CA (US); Dave Detlefs, Issaquah, WA (US); Michael Magruder, Carnation, WA (US); David Callahan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 12/495,582

(22) Filed: Jun. 30, 2009

(65) Prior Publication Data

US 2010/0332538 A1    Dec. 30, 2010

(51) Int. Cl.
*G06F 7/00* (2006.01)
(52) U.S. Cl. ......................................... 707/703; 718/101
(58) Field of Classification Search .................. 707/609, 707/910, 640, 650, 654, 658, 703; 711/158; 718/101
See application file for complete search history.

(56) References Cited

U.S. PATENT DOCUMENTS

| | | |
|---|---|---|
| 5,394,555 A | 2/1995 | Hunter |
| 5,404,555 A | 4/1995 | Liu |
| 5,428,761 A | 6/1995 | Herlihy et al. |
| 5,768,500 A | 6/1998 | Agrawal |
| 5,835,764 A | 11/1998 | Platt |
| 6,314,563 B1 | 11/2001 | Agesen |
| 6,665,704 B1 | 12/2003 | Singh |
| 6,751,617 B1 | 6/2004 | Anfindsen |
| 6,842,830 B2 | 1/2005 | Khare |
| 6,845,430 B2 | 1/2005 | Hopeman |
| 6,862,635 B1 | 3/2005 | Alverson |
| 6,871,264 B2 | 3/2005 | Soltis |
| 6,898,609 B2 | 5/2005 | Kerwin |
| 6,938,128 B1 | 8/2005 | Kuskin et al. |
| 6,976,155 B2 | 12/2005 | Drysdale |
| 7,111,294 B2 | 9/2006 | Steensgaard |
| 7,127,561 B2 | 10/2006 | Hill |
| 7,162,512 B1 | 1/2007 | Amit |
| 7,181,578 B1 | 2/2007 | Guha |
| 7,210,145 B2 | 4/2007 | Srinivasan |
| 7,213,106 B1 | 5/2007 | Koster |
| 7,246,123 B2 | 7/2007 | Carr |
| 7,320,065 B2 | 1/2008 | Gosior |
| 7,376,800 B1 | 5/2008 | Choquette |
| 7,395,382 B1 | 7/2008 | Moir |
| 7,406,698 B2 | 7/2008 | Richardson |
| 7,467,323 B2 | 12/2008 | Fields |
| 7,478,210 B2 | 1/2009 | Saha |
| 7,502,897 B2 | 3/2009 | Hertzberg |

(Continued)

OTHER PUBLICATIONS

Ananian; "Unbounded Transactional Memory"; 2009; pp. 1-12; http://supertech.csail.mit.edu/papers/xaction.ps.

(Continued)

*Primary Examiner* — Amy Ng
(74) *Attorney, Agent, or Firm* — Workman Nydegger

(57) ABSTRACT

Hardware assisted transactional memory system with open nested transactions. Embodiments include a system whereby hardware acceleration of transactions can be accomplished by implementing open nested transaction in hardware which respect software locks such that a top level transaction can be implemented in software, and thus not be limited by hardware constraints typical when using hardware transactional memory systems.

10 Claims, 4 Drawing Sheets

U.S. PATENT DOCUMENTS

| | | | |
|---|---|---|---|
| 7,512,636 | B2 | 3/2009 | Verma |
| 7,516,366 | B2 | 4/2009 | Lev |
| 7,584,232 | B2 | 9/2009 | Guo |
| 7,711,909 | B1 | 5/2010 | Lev et al. |
| 8,095,824 | B2 | 1/2012 | Gray |
| 2003/0188300 | A1 | 10/2003 | Patrudu |
| 2004/0243868 | A1 | 12/2004 | Toll et al. |
| 2005/0060495 | A1 | 3/2005 | Pistoulet |
| 2005/0246487 | A1 | 11/2005 | Ergan |
| 2006/0085591 | A1 | 4/2006 | Kumar |
| 2007/0143287 | A1 | 6/2007 | Adl-Tabatabai |
| 2007/0143741 | A1 | 6/2007 | Harris |
| 2007/0156780 | A1 | 7/2007 | Saha |
| 2007/0156994 | A1 | 7/2007 | Akkary |
| 2007/0198792 | A1 | 8/2007 | Dice |
| 2007/0198979 | A1 | 8/2007 | Dice |
| 2007/0239943 | A1 | 10/2007 | Dice |
| 2007/0245099 | A1 | 10/2007 | Gray |
| 2007/0245128 | A1 | 10/2007 | Gray |
| 2007/0260608 | A1 | 11/2007 | Hertzberg |
| 2007/0260942 | A1 | 11/2007 | Rajwar |
| 2008/0021934 | A1 | 1/2008 | Hudson |
| 2008/0040551 | A1 | 2/2008 | Gray |
| 2008/0127035 | A1 | 5/2008 | Lev |
| 2008/0162886 | A1 | 7/2008 | Saha |
| 2008/0163220 | A1 | 7/2008 | Wang |
| 2008/0270745 | A1 | 10/2008 | Saha |
| 2009/0006407 | A1 | 1/2009 | Magruder |
| 2009/0006467 | A1 | 1/2009 | Visscher |
| 2009/0006751 | A1 | 1/2009 | Taillefer |
| 2009/0006767 | A1 | 1/2009 | Saha |
| 2009/0007119 | A1 | 1/2009 | Blumrich |
| 2009/0019231 | A1 | 1/2009 | Cypher |
| 2009/0063780 | A1 | 3/2009 | Terechko |
| 2009/0089520 | A1 | 4/2009 | Saha |
| 2009/0113443 | A1 | 4/2009 | Heller |
| 2009/0172292 | A1 | 7/2009 | Saha |
| 2009/0172303 | A1 | 7/2009 | Welc |
| 2009/0172305 | A1 | 7/2009 | Shpeisman |
| 2009/0172306 | A1 | 7/2009 | Nussbaum |
| 2009/0172654 | A1 | 7/2009 | Zhao |
| 2009/0204969 | A1 | 8/2009 | Abadi |
| 2009/0235237 | A1 | 9/2009 | Yonghong |
| 2009/0235262 | A1 | 9/2009 | Ceze et al. |
| 2010/0131953 | A1 | 5/2010 | Dice |
| 2010/0162249 | A1* | 6/2010 | Shpeisman et al. ........... 718/101 |
| 2010/0169382 | A1 | 7/2010 | Sheaffer |
| 2010/0169579 | A1 | 7/2010 | Sheaffer |
| 2010/0169580 | A1 | 7/2010 | Sheaffer |
| 2010/0229043 | A1 | 9/2010 | Saha |
| 2010/0325630 | A1* | 12/2010 | Flood et al. .................. 718/101 |
| 2011/0145304 | A1 | 6/2011 | Gray |
| 2011/0145498 | A1 | 6/2011 | Taillefer |
| 2011/0145553 | A1 | 6/2011 | Levanoni |
| 2011/0145802 | A1 | 6/2011 | Levanoni |

OTHER PUBLICATIONS

Shriraman; "Hardware Acceleration of Software Transactional Memory"; Dec. 2005; pp.1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Repository/2.0/Body/ncstrl.ucsd_cse/CS2006-0873/postscript.

Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http ://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Moravan; "Supporting Nested Transactional Memory in LogTM"; Oct. 21-25, 2006; pp. 1-12; http://www.cs.wisc.edu/multifacet/papers/asplos06_nested_logtm.pdf.

Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.

Carlstrom; "The ATOMOΣ Transactional Programming Language";Jun. 11-16, 2006; pp. 1-13; http://tcc.stanford.edu/publications/tcc_pldi2006.pdf.

Chong; "Scalable HMM based Inference Engine in LVCSR"; Mar. 31, 2009; 1 page; http://www.icsi.berkeley.edu/cgi-bin/events/event.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

Bracy; "Disintermediated Active Communication"—Nov. 9, 2006—pp. 1-4—http://ieeexplore.ieee.org/stamp/stamp.jsp?arnurnber=04069172.

Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.

Andrew; "A Dictionary of HTML META Tags"—Feb. 11, 2007—pp. 1-11—http://vancouver-webpages.com/META/metatags.detail.html.

Spear; "Implementing and Exploiting Inevitability in Software Transactional Memory"—2008—pp. 59-66—http://ieeexplore.ieee.org/stamp/stamp.jsp?arnumber=04625833.

Author Unknown; Wikipedia; "Software Transactional Memory"—May 7, 2009—pp. 1-7—http://en.wikipedia.org/wiki/Software_transactional_memory.

Office Action dated Dec. 12, 2011 cited in U.S. Appl. No. 12/493,165.

Notice of Allowance dated Nov. 28, 2011 cited in U.S. Appl. No. 12/493,163.

Moss; "Open Nested Transactions"; Semantics and Support; 2006; pp. 1-8; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Curnow—"An Embedded Processor Architecture with Extensive Support for SoC Debug"—Retrieved Jun. 11, 2010; pp. 1-5.
Joao; "Flexible Reference-Counting-Based Hardware Acceleration for Garbage Collection"—Published Jun. 20-24, 2009 pp. 1-11.
Grossman; "The Transactional Memory/Garbage Collection Analogy"—Published Oct. 21-25, 2007—pp. 1-12.
Adl-Tabatabai; "Unlocking Concurrency"—Published Dec./Jan. 2006-2007 pp. 25-33.
Carlstrom; "Executing Java Programs with Transactional Memory"—Published Mar. 26, 2007 pp. 1-32.
Diestelhorst—"Hardware Acceleration for lock-free data structures and software-transactional memory"—Published Aug. 14, 2008 pp. 1-8.
Harizopoulos—"Steps towards cache-resident transaction processing"—Published 2004 pp. 1-12.
LIE—"Hardware Support for Unbounded Transactional Memory"—Published May 7, 2004 pp. 1-111.
Saha—"Architectural Support for Software Transactional Memory"—Published 2006 pp. 1-12.
Volos—"NePaITM: Design and Implementation of Nested Parallelism for Transactional Memory"—Published 2009, pp. 1-25.
Rothermel—"Concurrency Control Issues in Nested Transactions"—Published 1992, pp. 1-36.
Author Unknown—".NET Framework 4 Beta 1 enabled to use Software Transactional Memory (STM.NET Version 1.0)"—Published Jul. 24, 2009; pp. 1-84.
Nyte—"Nesting Models in Software Transactional Memory"—Published Sep. 14, 2007; pp. 1-3.
Agrawal—"Nested parallelism in transactional memory"—Published 2008; pp. 163-174.
Bobba—"Performance Pathologies in Hardware Transactional Memory"—Published 2007; pp. 1-11.
Author Unknown—"Hw-breakpoint: shared debugging registers"—Published Sep. 16, 2009; pp. 1-3.
Scherer—"Contention Management in Dynamic Software Transactional Memory"—Published Apr. 2004; pp. 1-10.
Zilles et al. "Extending Hardware Transactional Memory to Support Non-busy Waiting and Non-transactional Actions," Nov. 2006, pp. 1-10.
Office Action dated Feb. 3, 2012 cited in U.S. Appl. No. 12/493,164.
Office Action dated Jan. 20, 2012 cited in U.S. Appl. No. 12/493,167.
Notice of Allowance dated Feb. 21, 2012 cited in U.S. Appl. No. 12/493,161.
Office Action dated Mar. 29, 2012 cited in U.S. Appl. No. 12/493,168.
Office Action dated Mar. 16, 2012 cited in U.S. Appl. No. 12/493,162.
Notice of Allowance dated Apr. 9, 2012 cited in U.S. Appl. No. 12/493,161.
Office Action dated Apr. 4, 2012 cited in U.S. Appl. No. 12/638,929.

\* cited by examiner

HARDWARE ACCELERATED TRANSACTIONAL MEMORY SYSTEM WITH OPEN NESTED TRANSACTIONS

CROSS-REFERENCE TO RELATED APPLICATIONS

This application is related to U.S. patent application Ser. No. 12/493,168, filed Jun. 26, 2009, and entitled "MINIMIZING CODE DUPLICATION IN AN UNBOUNDED TRANSACTIONAL MEMORY", as well as U.S. application Ser. No. 12/493,167, filed Jun. 26, 2009, and entitled "PERFORMING ESCAPE ACTIONS IN TRANSACTIONS", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ-AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,165, filed Jun. 26, 2009, and entitled "METAPHYSICALLY ADDRESSED CACHE METADATA". All of the foregoing applications are being filed concurrently herewith and are incorporated herein by reference.

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations where for a given set of operations, either all of the operations should be performed or none of the operations are performed. The set of operations that should all be performed or not performed may sometimes be referred to as an atomic block of operations. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally available to other actors for reading or for further operations. Transactional computing can be implemented, in some systems, using specialized hardware that supports transactional memory. In systems where hardware does not support hardware based transaction computing, transactional computing can be performed by using software techniques.

Additionally, hardware based systems are more limited in the size of transactions that can be accomplished using the hardware. In particular, hardware based systems may use a level 1 data cache (L1D$) to buffer values for a transaction. The L1D$ is limited in size and as such, limits the size of transactions that can be performed using hardware based transactional memory. If a transaction requirements exceeds the size of the L1D$, then the transaction will abort and may not be able to be performed using the hardware based system.

Additionally, as application programmers create programs with larger and larger transactions, it becomes more and more likely that concurrent transactions on two threads exhibit a data access conflict to common shared data, and one transaction should be rolled back and reexecuted. If this happens too frequently the application performance does not scale up on multiprocessors. In particular this may occur given composition over modules that employ transactional memory with simple "closed" nested transaction rules. If two transactions T(A) and T(B) over atomic blocks A and B respectively, are run concurrently, and A and B both invoke a nested atomic block C to briefly manipulate shared state, then the window for conflict extends over the lifetimes of A and B rather than the (possibly disjoint) periods of time that T(A) and T(B) are in C.

A concrete example is two longer running transactions T(A) and T(B) each dynamically allocate memory using an allocator function malloc. Malloc manages a heap allocator free list data structure that is shared amongst all threads. Assuming malloc is itself also internally implemented using atomic blocks, then T(A) and T(B), invoking malloc, which uses a transaction T(malloc), will each attempt to acquire and hold write locks on malloc data structures, which they will retain for the duration of their respective transactions. Here contention on a briefly visited leaf shared data structure (malloc's free list) may cause T(A) and T(B) to conflict, and one may have to roll back and reexecute. This limits the practical size or duration of T(A) and T(B)—they cannot complete and commit concurrently.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method in a computer system to implement a hardware assisted transactional memory system at a single thread is implemented. The method includes beginning execution of a first transaction. Then, the method includes performing a data write access from within the first transaction. The data write access includes establishing a software visible indication that the data is being written. The indication is correlated to the data that is being written. The data write access further includes performing a write to memory. The method further includes then beginning execution of a second transaction. This includes executing processor level instructions to establish a hardware transactional execution mode on the thread. The method includes then performing a second memory access from within the second transaction. This includes executing processor level instructions to establish at least one of hardware conflict detection or speculative write buffering on the data. The method further includes then committing the second transaction, including executing processor level instructions to exit the transaction and commit speculatively buffered writes to become permanent and globally observed. The method further includes then committing the first transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
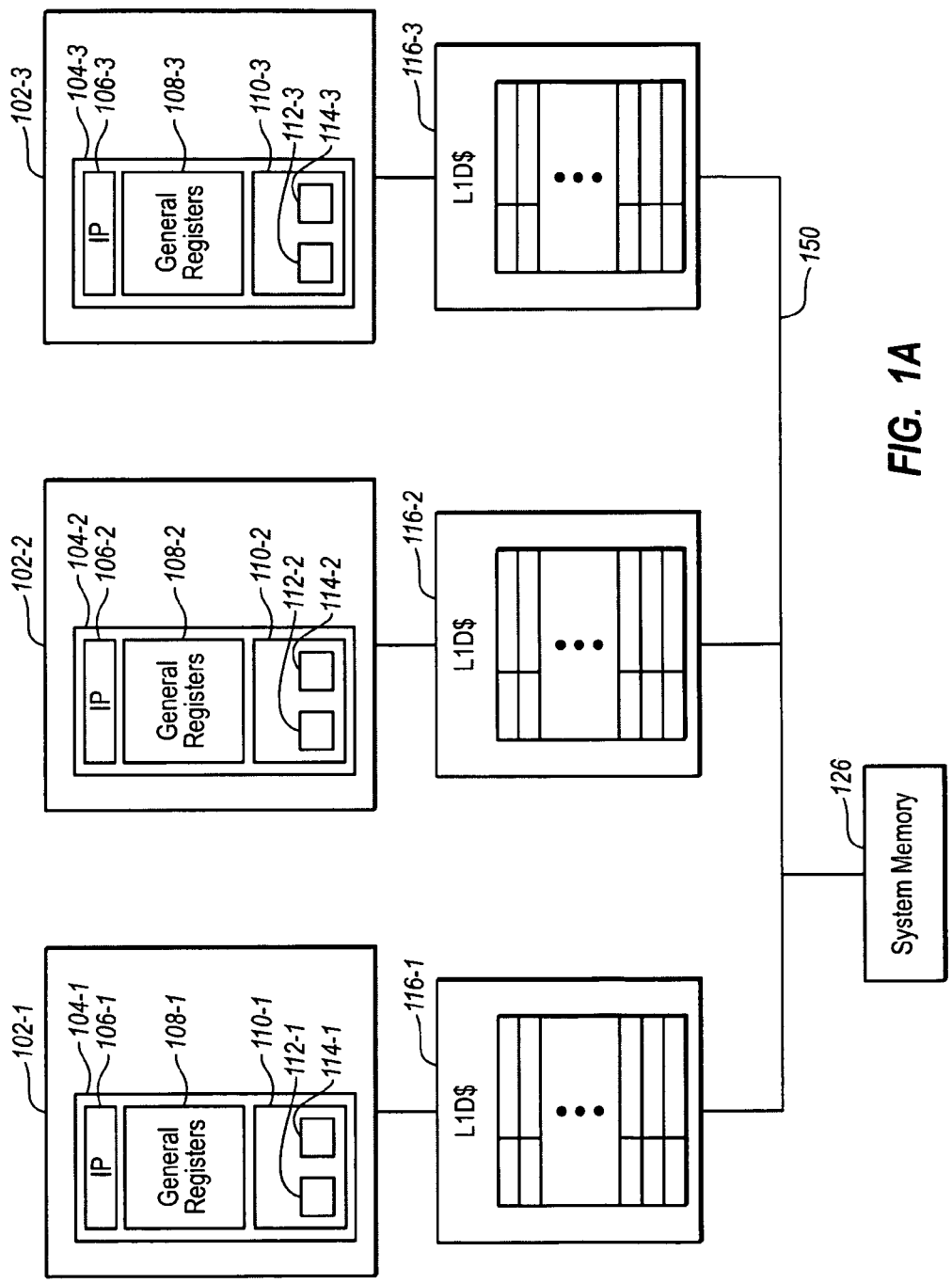
FIG. 1A illustrates a cache hierarchy.

The following presentation is organized into a broad description of the invention and surrounding context, followed by detailed examples of some embodiments that may be implemented.

Fast Flexible Unbounded Transactional Memory

Many modern computer systems comprise multiple processors, caches, and a memory system hierarchy that provides a shared memory to multiple threads running on the processors. Threads may concurrently access shared data structures in the shared memory.

It can be difficult to program such machines. Shared data may be accessed at any moment by other threads. It can be difficult to keep other threads from visiting a data structure while it is being modified, to guarantee data structure invariants across threads, etc. For example, consider a job scheduler that tracks the number of running jobs and finished jobs with counter variables. The sum of these counters should always equal the total number of jobs. The following C code illustrates a typical computation:

void end_job( ) {--running; ++finished;}

If the function end_job( ) is run on one thread while another thread reads the variables 'running' and 'finished', it is possible for the second thread to read inconsistent data, for example, reading the new value of running but the old value of finished.

Transactional memory ("TM") may provide a better programming model for multithreaded shared memory applications. Transactional memory promises to provide code with isolation from other threads' accesses, serialization, as if only one transaction runs to completion at a time, and atomicity, so that either all of the data written within a transaction take effect, or none do so.

An atomic block construct may be added to programming models or languages to provide TM semantics. This control structure delineates (defines the scope of) the statements in a transactional memory transaction. For example:

void atomic end_job( ) {atomic{end_job( );}}

In this example, atomic_end_job( ) begins a transaction, calls end_job( ) which accesses the counter variables, and then tries to commit the transaction. The function end_job( ) is run within a transaction; the programmer depends upon the TM system to ensure the counter updates are isolated, atomic, and serialize with respect to any accesses from other threads. The example also illustrates that code such as end_job( ) may be executed in absence of transactions or while within a transaction.

TM may be implemented in various ways. One approach, called bounded hardware TM ("HTM"), seeks to extend and repurpose the cache coherence machinery in a shared memory multiprocessor to provide two key mechanisms needed for correct implementation of TM semantics: conflict detection and version management.

Conflict detection discovers that data read in a transaction in one thread is concurrently written by another agent; or that data written in a transaction is concurrently read or written by another agent. Conflict detection makes transaction isolation and serializability possible. If throughout the lifetime of a transaction there are no data conflicts with any data read or written in the transaction, the transaction will serialize with respect to other agents' memory accesses and transactions.

Version management is used to buffer speculative writes to data in a transaction, until the transaction commits all such writes so they become permanent and globally observed by other agents. In the event of a data conflict, a transaction aborts, by rolling back any speculative writes it performed, and optionally starting over to reexecute the body of the atomic block.

The cache coherence system in a shared memory multiprocessor is a starting point in building a hardware transactional memory system. A plurality of processors with a plurality of caches, possibly private, are coordinated so as to provide software with the illusion of a single, fast shared memory. Sometimes data is found in system memory, and sometimes the latest version is found in one or more data cache lines. When an agent writes its cache's copy of the data, that data is the newest version of the data. If another agent attempts to read the same data, it sources it from the first agent's copy, rather than the stale copy in some other cache or in system memory. This is accomplished by means of a cache coherence protocol such as MESI. MESI (modified, exclusive, shared, invalid) is named for the cache line sharing state and state machine associated with each cache line in each coherent cache in the system. A cache coherence protocol may require agents to observe ("snoop") external reads and writes by the other agents in the system. As one agent reads data or writes data, a request is sent that is snooped by other agents' caches. This may cause a copy of the data cached in one cache to be invalidated, updated, or shared with other caches or with system memory.

These per-line coherence state machine transitions also correspond to the kinds of data conflicts that an HTM needs to detect. If a thread's cache line contains data read in a transaction, and then another agent writes it, the thread's cache's state may be changed. A similar process holds for a transactional write. Some embodiments provide indicators "read monitor" ("RM") and "write monitor" ("WM"), as will be illustrated in further detail in FIGS. 1A and 1B below, at 128 and 130 respectively, and associated behaviors to each cache line entry, to identify which lines are transactionally read and/or written within a transaction, it is possible for cache hardware to detect conflicting accesses to the transaction's sets of read data and written data.

Figure 1B:
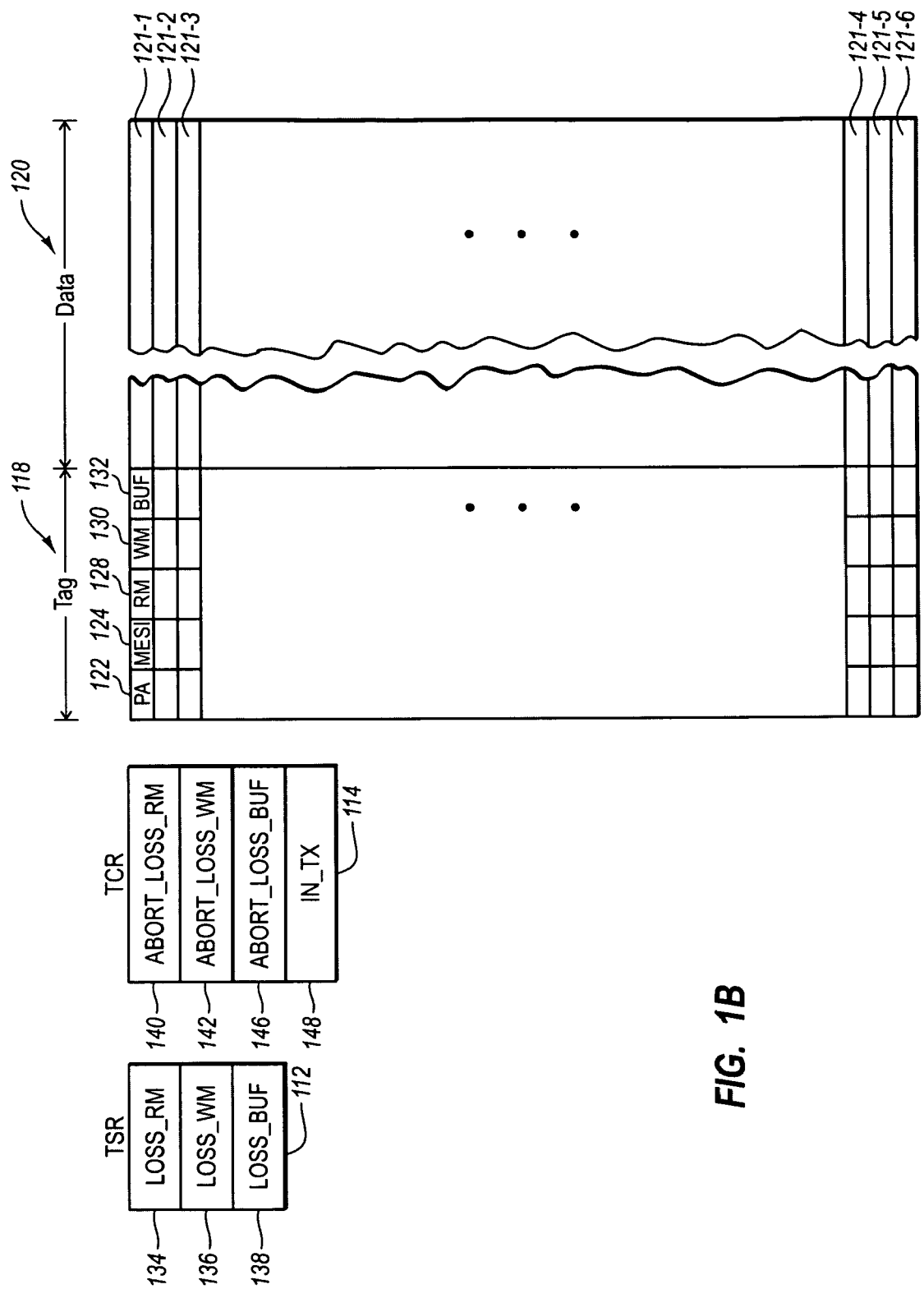
FIG. 1B illustrates details of a data cache with monitoring enabled.

A cache also provides a basis upon which to implement data version management. If a cache is private to an agent, then during a transaction its cache lines may be repurposed to buffer speculatively written data from within the transaction. In some embodiments cache line entries may also comprise a "buffering indicator" ("BUF"), as illustrated in FIG. 1B below at 132, to identify transactionally written lines. Buffered cache data lines are temporarily exempt from cache coherence processing. If another agent requests the latest version of a cache line, the cache does not forward its buffered line because the transaction has not committed and its writes should not be observed by other agents. HTM transaction commit clears buffering indicators across all cache lines such that these lines are again globally observed. HTM transaction abort invalidates any cache lines marked with buffering indicators so any speculatively written data on those lines is discarded.

In some embodiments new instructions enable software to begin, commit, abort, suspend, and handle aborts for HTM transactions. A transaction begin (e.g. "TB") instruction puts the thread in "HTM mode" wherein all subsequent memory accesses are implicitly transactional, setting RM on memory loads and setting WM and BUF on memory stores; a transaction exit and commit (e.g. "TXCOM") instruction tries to commit the transaction, atomically clearing RM, WM, and BUF on cache lines; and so forth. For example, the following illustrates assembly code using the new instructions included in the extended instruction set architecture ("ISA") approximately corresponding to the atomic_end_job( ) function:

```
TB             ; begin transaction
DECR running   ; --running;' implicitly transactional R+W
INCR finished  ; ++finished; implicitly transactional R+W
TXCOM          ; try to exit and commit the transaction
```

This implementation of TM may be designated a cache resident, implicitly transactional TM ("CRITM").

When a transaction's set of memory accesses do not fit in the cache, the cache necessarily evicts a monitored or buffered cache line. In some embodiments this may cause the transaction to abort. Retrying the transaction may not help. In an n-way set associative cache based implementation, a transaction may abort after as few as n+1 memory accesses. Therefore an HTM in itself may not serve as the sole basis of a general purpose transactional memory system.

Nevertheless, some embodiments may elect to run small, simple transactions in an HTM mode and fall back to a more general mechanism when necessary.

Some embodiments may expose to software the RM, WM, and BUF properties that are logically associated with each cache line sized block of memory in the system, and physically associated with the set of cached lines in the cache at a given time. Making these properties visible to the instruction set architecture allows software to explicitly set these properties on an address to monitor it against conflicting accesses by other agents, to explicitly buffer selected data, to test these properties on an address, and to observe any loss of these properties. In some embodiments each thread has its own private copy of these properties.

TM may also be implemented entirely in software ("STM"). For a given memory load or store in the program in the scope of execution of a transaction, an STM system employs an STM read or write barrier that wraps the load or store with code to perform conflict detection and version management. In some embodiments, an STM associates some STM state with each data item or chunk of data. In some embodiments, the state is a word of memory stored alongside or otherwise correlated to the data—for example, a "TMW"—a TM metadata word—that at different times may hold a lock for the data, or a version number of timestamp for the data. Different transactions across threads may inspect data's TMWs to perform conflict detection, e.g. to determine if the data is locked by another transaction, or if the data has been written by another transaction since it was read by this transaction. In some embodiments an STM write barrier may attempt to lock the data (via its TMW) against access by other threads and log its original value in case the write may need to be rolled back, and an STM read barrier may check the data's TMW to determine whether the data is locked, and note the data's version or timestamp, in addition to performing a store or load respectively. STM barrier bookkeeping overheads can impact the performance of software executed in an STM implementation.

In some embodiments transactional memory programming constructs such as atomic blocks fully compose with other constructs such as loops. It has been observed that if a data access occurs within a loop in a transaction, the data access' TM barrier may be performed for the same data over and over again at considerable overhead. In some embodiments it suffices to take a TM read or write barrier once per transaction per data item. Therefore a significant performance optimization may be to apply a "barrier filter" to a TM barrier code sequence, which employs a filter indicator state per address per transaction, and first tests this indicator to determine whether the barrier has already been performed for this data address in this transaction; if so, the rest of the barrier is skipped; if not, the rest of the barrier is performed and the indicator is set to record the read or write barrier has been performed for this data item for this transaction.

It is expensive for a software implementation to maintain and consult this filter indicator for each data item accessed in a transaction. Therefore it may be beneficial to provide hardware assistance to associate per-transaction per-address state for each data item that may be accessed. In some embodiments the RM, WM, and BUF indicators described above, in addition to their roles in conflict detection monitoring and write buffering, may also be used as filter indicators, where the processor instruction set includes instructions to explicitly set, reset, and test the state of these respective indicators. For example in some embodiments the instructions to test RM, WM, and BUF properties for an address might be designated TESTRM, TESTWM, and TESTBUF. In some embodiments such test instructions might set a processor condition code or similar branch predication indicator if a property is set for the address. In some embodiments the processor condition code is already present in a legacy ISA from which an extended ISA is derived. One such processor condition code is the carry flag CF implemented in many ISAs.

Therefore, a hardware accelerated STM ("HASTM") may be implemented such that on processors with this transactional memory hardware support, the RM, WM, and BUF indicators may be used by HASTM read and write barriers to perform redundant barrier filtering by testing the presence of a indicator for an accessed data item. If set, the barrier has already been performed for the item and the rest of the barrier code can be skipped; if not set, it may be the barrier has not yet been performed, or it may be the indicator was lost when the cache line holding the indicator was evicted or invalidated. If not set, the rest of the barrier including the STM conflict detection and version management bookkeeping are performed as before and the indicator is set for the data item.

To further increase the performance of the TM system, in some embodiments it may be possible to run each threads' transactions (if any) in transaction execution modes specific to the size, duration, and complexity of each respective transaction. If a transaction is small and simple, it may successfully execute and commit using CRITM execution mode. If a transaction is large, long running, or complex, it may require execution in an STM or HASTM execution mode. If a transaction is run on an older legacy processor that lacks TM hardware extensions, it may have to run in STM mode. Other threads sharing the same shared memory may be running code non-transactionally (in the 'non-transactional' TM mode). So multiple threads may simultaneously run various transactions in various transaction execution modes.

This approach may offer the best of both worlds: the efficiency of hardware TM execution when possible and the generality of software TM otherwise. However a TM system should operate correctly even when there are potential or actual data access conflicts across threads running in different modes. So STM threads' conflict detection and version management data structures and algorithms can be made compatible with HTM threads' cache based approaches.

In some embodiments this may be accomplished by a "cache resident implicitly-transactional STM-compatible TM" ("CRISTM") TM execution mode. Like CRITM, CRISTM performs conflict detection and data versioning in hardware, implicitly as data items are accessed, and also CRISTM employs read and write barriers that first test the data's STM lock state (e.g. in its TMW) if any to ensure it is not locked by another STM thread. This implicitly sets a read monitor on the data's lock. In this way, CRISTM-mode threads respect STM locks, and subsequent STM data writes on other threads may be observed (for example, via loss of read monitoring) by CRISTM based threads. Similarly, CRISTM write barriers obey the particular STM's data, lock, versioning, and/or timestamp discipline particular to a given STM algorithm. For example, if after an STM transaction, a data item's TMW is updated with a new version so that other STM transactions may detect a read-write data conflict, then in the same way, a CRISTM write barrier will (in addition to writing the data) write an updated version in the data item's TMW. Because CRISTM writes are buffered, this TMW write is write buffered and only becomes globally observed when and if its CRISTM transaction commits.

In some embodiments such approaches allow multiple threads to concurrently execute multiple transactions using multiple transactional execution modes, correctly and efficiently. A transaction may start in a hardware accelerated mode like CRISTM and on abort, roll back the transaction and reexecute it using a software based TM implementation, and do so without disturbing execution of code including TM code that may be executing on other threads.

Implicit and Explicit Hardware Transactional Memory Semantics

A cache based HTM as described above provides an efficient implementation of TM for transactions that fit in the limited capacity of the thread's private view of its cache.

It may be desirable to reduce the set of data accesses that receive hardware transactional memory semantics such as data conflict monitoring and speculative write buffering. In particular, when executing a transaction, some data accesses, such as to data shared with other threads, may require TM semantics, whereas other data accesses, such as to thread private variables on the stack, may not. If there were a way for software to differentiate the two cases to hardware, it may be possible to run a larger transaction in a given cache by selectively providing TM semantics to just the subset of the data accesses that require it.

In some embodiments such as the HTM described above, an instruction or other ISA mechanism is performed to establish an ambient HTM transaction execution mode on the thread such that data accesses are implicitly and automatically given TM semantics.

In some embodiments, an instruction or other ISA mechanism may be performed to selectively perform a data access that does not receive TM semantics within an HTM transaction execution mode.

In some embodiments, an instruction or other ISA mechanism may be performed to perform a data access that receives TM semantics even if the thread is not in an HTM execution mode.

In some embodiments, such as the Intel x86 and Intel64 architecture, most instructions may have memory operands that implicitly perform read and/or write memory accesses. In some embodiments a possibly optional instruction prefix may designate the memory accesses of the instruction to be explicitly transactional, explicitly not-transactional, or to explicitly receive the current thread ambient transactional semantics, or to explicitly receive the opposite of the current thread ambient transactional semantics, or otherwise modify the default transactional semantics the instruction would otherwise receive.

In some embodiments such as the Intel x86 and Intel64 architecture, memory operands on instructions refer to a default segment selector such as DS: or CS: or SS:, and instructions may also encode alternate selectors. In some embodiments of an HTM, the segment selector may be repurposed to also selectively control whether the data access specified by the instruction's memory operand should receive or not receive transactional semantics. In some embodiments, the specific transactional semantics associating behavior of each selector or sets of selectors in this configuration may be accomplished by setting a selector transaction indication mode control field in a special register in the thread context. In some embodiments various settings of this mode control field may make some or all segment selectors designate explicitly transactional, explicitly non-transactional, thread-ambient, or explicitly contra-thread-ambient transactional semantics for their data accesses.

Some embodiments may eschew implicitly transactional access modes and memory accesses, and instead implement an STM-compatible cache resident hardware TM that uses explicitly transactional memory access instructions. Such a transactional execution mode might be designated "cache resident, explicitly-transactional, STM-compatible TM" ("CRESTM"). Like CRISTM, CRESTM performs conflict detection and data versioning in hardware, for example via read and write monitors and write buffering. Like CRISTM, CRESTM uses STM compatible read and write barriers that in some embodiments 1) load and test the data's STM lock state (e.g. in a TMW) (e.g. via a load-and-explicitly-set-read-monitor instruction where one example may be referred to herein as "MOVXM") to check it is not already locked by another STM thread; and 2) store (e.g. via a store-and-explicitly-set-buffering instruction where one example may be referred to herein as "MOVXB") a new version (or timestamp, etc.) to the data's TMW. These barriers explicitly set a read monitor on the data's TMW and a write monitor and buffering on the data's TMW so that a subsequent conflicting access to transaction data by a thread running an STM execution mode can be observed by a CRISTM or CRESTM mode thread as a loss of read monitoring, write monitoring, or buffering.

Open Nested Transactions ("ONT")

As transactions get larger and larger, it becomes more and more likely that concurrent transactions on two threads exhibit a data access conflict to common shared data, and one transaction is rolled back and reexecuted. If this happens too frequently the application performance may not scale up on a multiprocessor as desired. Large transactions and conflicting accesses sometimes arise given composition of code modules that use TM given simple "closed" nested transaction rules. For example, if two transactions T(A) and T(B) over atomic blocks A and B are run concurrently, and A and B both invoke a nested atomic block C to briefly manipulate C's shared state, then the time window for conflict extends over the lifetimes of A and B rather than the (possibly disjoint) periods of time that A and B are in C.

A concrete example is two longer running transactions T(A) and T(B) each dynamically allocate memory using an allocator function malloc. Malloc manages a heap allocator free list data structure that is shared amongst all threads. Assuming malloc is itself also internally implemented using atomic blocks, then T(A) and T(B), invoking malloc, which uses a transaction T(malloc), will each attempt to acquire and hold write locks on malloc data structures, which they will retain for the duration of their respective transactions. Here contention on a briefly visited leaf shared data structure (malloc's free list) may cause T(A) and T(B) to conflict, and one may have to roll back and reexecute. This limits the practical size or duration of T(A) and T(B)—they cannot complete and commit concurrently.

Instead, malloc may employ "open" nested transactions. When T(A) or T(B), each running an atomic block, invokes malloc and its open nested atomic block OT (malloc), the TM system runs OT (malloc) as if it were a "top level" non-nested transaction, in its own transactional isolation domain, sharing none of the outer transaction's write set, contributing nothing to the outer transaction's read or write sets, except an "abstract lock" that stands for the logical operation performed on malloc, and designating compensating actions (or optional deferred actions) on OT (malloc) should the outer transaction abort (or respectively commit). In other words, once OT (malloc) commits, none of the memory accesses it performed will cause data conflicts in the outer transaction or other transactions.

In particular, when T(A) calls malloc and begins an open nested atomic block, the TM system performs an escape action, suspending T(A) on the thread and marshaling the malloc parameters out of the T(A) transaction; then it begins a new "top level" transaction on the same thread, e.g. OT (malloc), reading from globally committed state, directly committing its updates to global state, and finally committing its open nested transaction and releasing its locks. As usual if there is contention on data, the open nested transaction can roll back and reexecute, which has no impact on the suspended transaction T(A). A compensating action (e.g. free( )) may be recorded in the T(A) transaction log, and the thread resumes T(A) and its isolation. If T(A) subsequently aborts, the compensating action is invoked, which (perhaps transactionally) undoes the logical effects of the earlier operation.

In this fashion concurrently executing transactions T(A) and T(B) may repeatedly interleave inner open nested transactions over the shared data structures, without dooming T(A) or T(B) to conflict with one another. Both can potentially complete and commit concurrently.

Open Nested Transactions' Semantics

The semantics of shared data references amongst the outer transaction and its inner open nested transaction remains an important detail. In particular, embodiments may be directed to address what should happen if the inner transaction reads or writes data written or read (respectively) by the outer transaction. Some embodiments provide an ONT model in which the inner open nested transaction is a true top level transaction, with no special access to the isolated transactional state of its outer transaction. It just happens to be running on the thread of the (now suspended) outer transaction. So just as if some other top level transaction were running on another thread and trying to read or write data of the outer transaction, here to, conflicting accesses (write-write, read-write, write-read) to state accessed by outer transaction and inner transaction are data conflicts that lead to abort and possible reexecution of the inner transaction.

The following presentation provides several example execution sequences to illustrate these particular semantics for open nested transactions.

The following example illustrates that an inner nested transaction becomes permanent and globally observed as soon as it commits, even if its enclosing outer transaction aborts.

```
x = 0;
atomic /*T1*/ {
    open atomic /*T1.T2*/ {
        x = 1;
    }                          // x = 1 is globally observed at this point!
    abort_transaction( );      // abort T1
}
assert(x == 1);                // T1.T2 committed
```

The following example illustrates the potential for concurrent execution using open nested transactions. The execution of the two threads is interleaved vertically as depicted.

```
Thread 1                              Thread 2
x = 0;
atomic /*T1*/{
                                      atomic /*T2*/ {
    open atomic /*T1.T3*/ {
        ++x;
    }
    // on commit releases any
    //       locks on 'x'
                                          open atomic /*T2.T4*/ {
                                              ++x; // no conflict T1 or T1.T3
                                          }
                                          // on commit releases any
                                          //    locks on 'x'
    ...                                   ...
                                      }
}
// ... wait for thread 2 then ...
assert(x == 2);
```

In this example, transactions T1 and T2 on threads 1 and 2, executing concurrently, execute inner open nested transactions T1.T3 and T2.T4 and each may access a common shared memory variable 'x', one after another, without incurring any data conflicts. All transactions may commit successfully.

The following examples illustrate read-write and write-read data conflicts between an outer transaction and its inner open nested transaction on the same thread, which are idiomatic of some embodiments' particular data conflict semantics for open nested transactions.

```
// Conflict #1
x = 0;
y = 0;
atomic /*T1*/ {
    x = 1;            // write x
    open atomic /*T1.T2*/ {
        y = x;        // data conflict, T1.T2 read x vs. T1 write x,
                      // T1.T2 aborts!
    }
}
// conflict #2
x = 0;
y = 0;
atomic /*T1*/ {
    y = x;            // read x, write y
    open atomic /*T1.T2*/ {
        x = 1;        // data conflict, T1.T2 write x vs. T1 read x,
                      // T1.T2 aborts!
    }
}
```

The following example illustrates a data conflict between an inner open nested transaction and some other transaction, which is similar to a data conflict between two top level transactions.

```
Thread 1                        Thread 2
x = 0;
y = 0;
atomic /*T1*/{
                                atomic /*T2*/ {
                                    y = 1;   // write y
    open atomic /*T1.T3*/ {
        x = y;
        // data conflict,
        //   T1.T3 read y vs. T2 write y
        // T1.T3 aborts
    }
    ...                         ...
}
```

In some embodiments this leads to a programming model discipline in which the inner nested transaction's state should correspond to a disjoint software abstraction layer (with disjoint shared memory state) in a modular decomposition of a program. In this model, any direct access to common shared state from both the outer transaction and the inner open nested transaction is a programming error.

Open Nested Transactions and Hardware Assisted Transactions

As described above, the basic hardware TM insight is that a multiprocessor shared memory cache coherence system affords an efficient implementation of hardware transactional memory, using snooping for conflict management and private data caches for version management, except the transaction size is bounded by the capacity of the cache to hold the read and write sets of the transaction for the duration (which may be particularly limited in lieu of fully associative caches).

A transactional memory system that supports library composition may need to run transactions over transactions over transactions, etc., with outer transactions of arbitrary size and duration. In some embodiments, large, long-running transactions won't fit in private data caches and if run in a cache resident hardware TM mode will overflow and abort. Instead they may run in a software TM execution mode and use STM data structures and STM conflict detection and version management (e.g. locking, versioning, logging, etc.) implemented in STM read and write barriers.

However, if inner transactions are of modest size and duration, it possible to run them in cache resident transaction modes. Through judicious use of an open nested transaction programming model, large transactions may be decomposed into a large outer transaction containing a series of smaller, inner open nested, cache resident hardware assisted transactions that each fit into the bounded capacity of private L1 data caches. If most of the total time in the outer transaction is spent in these inner transactions, then hardware TM assist may help implement and accelerate an unbounded TM system.

Nested Transactions Wherein the Outer Transaction is a Software Transaction and the Inner Open Nested Transaction is a Hardware Transaction As described earlier, some embodiments implement a transactional memory system with (across threads) various TM execution modes, in which large (possibly suspended) STM transactions coexist correctly with small cache resident (but software locks, versions, and log-respecting) hardware transactions. Accordingly, ONT runs the outer transaction in an STM mode, and may run the inner transaction in an STM mode, or a hardware assisted TM mode, if the necessary hardware extensions are present and depending upon other considerations described below.

As control flow reaches an open atomic block, the TM system should determine in which mode to run it. It may run in an STM mode, with its own (per-transaction) locks and version management, or it may run in a cache resident hardware execution mode. The latter may be faster if 1) the transaction's read and write sets fit into cache, so that it may commit; 2) the transaction does not use semantics or facilities that are not or cannot be provided by the cache resident HTM (such as further open nesting or parallel nesting).

Then for all in- and out-parameters of the inner open transaction, the TM system should marshal them from the outer transaction's memory isolation domain into regular shared memory. (For malloc(n) this would just be the constant n.) The TM system suspends the outer STM transaction, then executes the inner open nested transaction in an STM-locks-compatible cache resident hardware transactional execution mode such as CRISTM or CRESTM. Every access to data respects the software lock discipline on the data. Thus if the inner transaction reads state that is write locked by any other transaction (including its outer transaction) it sees a data conflict. Similarly if the inner transaction writes and successfully commits some data that was read by another transaction (including its outer transaction) that will cause a subsequent version conflict in the other transaction. If any other thread performs a conflicting data access with the read or write monitored data of this inner transaction, this is also detected by a loss of monitoring. In summary here is a pseudocode outline of example steps to perform an inner open nested transaction in a cache resident hardware mode, within an outer transaction in an STM compatible mode. These steps are merely examples and should not be interpreted as limiting to every embodiment.

```
execute_inner_open_nested_transaction {
    marshal arguments to globally observed shared memory
    suspend outer transaction
    determine new TM execution mode for inner txn (STM or CR*STM))
    if new mode is CRISTM {
        set TX object on thread and set TX vtables for CRISTM barriers
        enable ejection handler on loss RM / WM / BUF
        do {
            TB // transaction begin instruction
            try {
                inner_atomic_block( );
                // CRISTM read barriers test locks on data
                // CRISTM write barriers test and respect locks
                //    and update versions
            } catch (...) ...
            TXCOM // transaction exit and try to commit
        } while (re-execute ...)
    }
    else if new mode is STM { ... } else ...
    log compensating actions (if any) into outer tx log
    resume outer transaction (reestablish TM execution mode, etc.)
}
```

In some embodiments, when a given inner atomic block is run in one transactional execution mode and that transaction aborts, the TM system may automatically elect to try to rerun the inner atomic block in another mode. For example, after trying to run the inner transaction in CRISTM mode and aborting, the TM system may try again in STM mode.

As noted above, it is important to determine the right execution mode for the inner open nested transaction. CR*STM modes are more efficient when the inner transaction fits in cache and the transaction does not use functionality that is not provided by a cache resident HTM (such as further transaction nesting, retry, etc). Furthermore, under heavy load or contention, a contention manager may achieve better system throughput if the inner transaction is run in software and uses a more pessimistic software locking discipline. Static analysis and dynamic feedback can help select a good transactional execution mode for a given situation.

In some embodiments, the TM system and/or its compiler analyzes and annotates each inner atomic block site with indicators (or hints) to summarize whether the inner atomic block uses any features or semantics that cannot be provided in a cache resident TM, or if by inspection the memory access footprint of the block is manifestly too large to run in a cache resident transaction in any extant or foreseeable system.

In some embodiments, the TM system keeps a history of which transactional execution modes were selected for each inner atomic block site and statistics on how often a given mode committed successfully at each inner atomic block site. For example, if an inner atomic block that is executed in a CRISTM or CRESTM transactional execution mode consistently fails to commit due a cache capacity problem, the TM system may reduce or eliminate attempts to execute the particular block using a cache resident HTM mode due to the low observed commit rate statistic.

In some embodiments, the statistics may be a single inner atomic block commit rate. In some embodiments, the statistics may be per unique atomic block site. In some embodiments, the statistics may be per unique (caller, site) pair basis, to allow the transactional execution mode selection code to better discriminate and tune for specific different callers or code pathways into the inner atomic block.

In summary, in some embodiments, executing large transactions as a series of smaller open nested transactions, using hardware based conflict detection and monitoring, while also respecting STM lock and versioning disciplines, allows arbitrarily large compositional transactions to nevertheless run as a series of low overhead highly concurrent and scalable cache resident hardware mode transactions.

As described earlier, in some embodiments, an application comprising of a plurality of threads may simultaneously run transactions in various transactional memory execution modes on the threads, alongside other threads that are not running transactions. In addition, in some embodiments, some of the threads may be executing nested transactions, even deeply nested ones, with some outer transactions in STM modes and inner transactions in STM or cache resident hardware TM modes.

Nested Transactions Wherein the Outer Transaction is a Hardware Transaction and the Inner Open Nested Transaction is a Software Transaction As described above, some embodiments may execute a large outer transaction in an STM execution mode while executing any inner open nested transactions in a hardware TM mode. Similarly, and contrariwise, some embodiments may execute an outer transaction in a hardware TM mode while executing any inner open nested transactions in a software mode. The latter combination may have utility when the entire outer transaction fits in the bounded size of a hardware transaction (which in some embodiments is in the private data cache footprint) and when it is desirable to run the inner transactions in a software TM mode so that the outer transaction may run in a hardware mode. This approach also enables the TM system to keep the inner transaction read and write sets from consuming limited hardware-based transactional conflict detection and buffering resources. For example, in some embodiments, it is not necessary to establish read or write monitoring, or buffering, on data accesses in any inner open nested transactions that run in a software TM mode.

The programmer visible semantics of open nested transactions as described above remain the same. The inner transaction executes as if it is a top level transaction that happens to be executing on a thread with a suspended outer transaction—a suspended hardware transaction mode transaction in this case. The TM system overall still detects data conflicts between the outer transaction and the inner transaction.

In some embodiments, the outer transaction is run in a hardware TM mode. This may require executing processor level instructions to begin the transaction and establish implicit monitoring and buffering of memory reads and writes. In some embodiments, the hardware transaction may begin without establishing implicit monitoring and buffering of memory accesses. Instead, at each memory access site, the TM system may execute processor level instructions to explicitly establish read or write monitoring or buffering on the accessed data.

To support transaction semantics, the transaction should also participate in data conflict detection and data versioning with respect to other threads and transactions. Therefore the hardware TM mode should include an STM lock respecting implementation such as CRISTM or CRESTM described above. Accordingly, memory accesses within the outer transaction may employ hardware-based monitoring for data conflict detection and buffering for data versioning. The following example illustrates some aspects of execution of an outer transaction in a hardware mode and an inner transaction in a software mode in one embodiment:

```
//Source Code        // assembly:      // comment:
x = 0;               // mov [x],0      // initialize x
```

15
-continued

| | | |
|---|---|---|
| y = 0; | // mov [y],0 | // initialize y |
| atomic /*T1*/ { | // TB | // begin HW transaction mode |
|    y = 1; | // mov [y],1 | // implicitly set WM & BUF |
| | // ... | // (elided CRISTM read & write barrier) |
|    open atomic/*T2*/{ | // TX | // suspend T1, now current |
| | // ... | //   TM execution mode is STM |
|       ++x; | // inc [x] | // no monitoring or buffering |
| | // ... | // (elided STM read & write barrier) |
|    } | // TB | // resume T1 |
| | // ... | // current TM execution mode is an HTM |
|    ++y; | // inc [y] | // set implicit RM, WM, & BUF |
| } | // TXCOM | // exit and commit T1 |

This example illustrates that the outer transaction runs in a hardware mode, establishing an implicit hardware transaction by executing an exemplary instruction referred to herein as "TB" and exiting and trying to commit the transaction by executing an exemplary instruction referred to herein as "TXCOM". In addition, to begin the inner open nested transaction T2, the system suspends implicit hardware transaction mode T1 by executing an exemplary instruction to exit (i.e. suspend) the transaction referred to herein as "TX", and a matching exemplary instruction "TB" described above to reestablish implicit transactional data accesses. The accesses to 'y' in T1 are performed as data load and store instructions that also implicitly set read monitoring, and write monitoring and buffering, respectively. These accesses also respect the STM lock discipline as described above for CRISTM mode. The accesses to 'x' in T2 are performed as STM reads and writes that respect STM locks and update STM versions or timestamps. No later than when the inner open nested transaction T2 commits, the update to 'x' becomes globally observed by all threads and transactions (including T1).

In the previous example, the outer transaction was run in an implicit hardware transaction mode in which ordinary data load and store instructions receive transactional memory semantics. In another embodiment, the outer transaction may be run in a hardware transaction mode in which only explicitly designated load and store instructions receive TM semantics, such as CRESTM described above. The following example illustrates some aspects of execution of such a scenario:

| | | |
|---|---|---|
| //Source Code | // assembly: | // comment: |
| x = 0; | // mov [x],0 | // initialize x |
| y = 0; | // mov [y],0 | // initialize y |
| atomic /*T1*/ { | // TB2 | // begin non-implicit HW transaction mode |
|    y = 1; | // movxm eax,tmw[y] | // load and set RM on y's TMW |
| | // ... | // (elided rest of CRESTM write barrier) |
| | // movxb [y],1 | // store and explicitly set WM & BUF |
|    open atomic/*T2*/{ | // ... | // suspend T1, now current |
| | // ... | //   TM execution mode is STM |
|       ++x; | // inc [x] | // not implicitly monitored nor buffering |
| | // ... | // (elided STM read & write barrier) |
|    } | // ... | // resume T1 |
| | // ... | // current TM execution mode is an HTM |
| | // ... | // (elided rest of CRESTM write barrier) |
|    ++y; | // movxm eax,tmw[y] | // load and set RM on y's TMW |
| | // ... | // (elided rest of CRESTM read & write br) |
| | // movxm eax,[y] | // load and explicitly set RM |
| | // inc eax | // ++x |
| | // movxb [y],eax | // store and explicitly set WM and BUF |
| } | // TXCOM | // exit and commit T1 |

16

This example illustrates that the outer transaction runs in a hardware mode that does not establish implicit monitoring and buffering of regular loads and store instructions, by executing an exemplary instruction referred to herein as "TB2" and exiting and trying to commit the transaction by executing an exemplary instruction referred to herein as "TXCOM". The accesses to 'y' in T1 are performed via exemplary data load and store instructions that explicitly set read monitoring, and write monitoring and buffering, respectively, illustrated earlier as MOVXM and MOVXB. These accesses also respect the STM lock discipline as described above for CRESTM mode. The accesses to 'x' in T2 are performed as STM reads and writes that respect STM locks and update STM versions or timestamps. No later than when the inner open nested transaction T2 commits, the update to 'x' becomes globally observed by all threads and transactions (including T1).

In some embodiments, there exist processor level instructions to perform explicitly non-transactional (or non-monitored, non-buffered) loads and stores from within a hardware transaction in which regular loads and stores are implicitly transactional (e.g. a mode with implicitly read monitored loads and implicitly write monitored and buffered stores), one example of which is illustrated herein as "MOVXU" ("move explicitly unmonitored"). Such explicitly non-transactional loads and stores may be used to perform the globally observed loads and stores required by the inner open nested transaction, running in an STM mode. The following example illustrates some aspects of execution of such a scenario:

| | | |
|---|---|---|
| //Source Code | // assembly: | // comment: |
| x = 0; | // mov [x],0 | // initialize x |
| y = 0; | // mov [y],0 | // initialize y |
| atomic /*T1*/ { | // TB | // begin HW transaction mode |
|    y = 1; | // mov [y],1 | // implicitly set WM & BUF |
| | // ... | // (elided CRISTM read & write barrier) |
|    open atomic/*T2*/{ | // ... | // suspend T1, now current |
| | // ... | //   TM execution mode is STM |
|       ++x; | // movxu eax, [x] | // load x, explicitly does not set RM |
| | // inc eax | |
| | // movxu [x],eax | // store x, does not set WM or BUF |
| | // ... | // (elided STM read & write barrier) |

-continued

| } | // ... | // resume T1 |
| | // ... | // current TM execution mode is an HTM |
| ++y; | // inc [y] | // set implicit RM, WM, & BUF |
| } | // TXCOM | // exit and commit T1 |

This example illustrates the use of explicitly non-transactional loads and stores (using exemplary instructions MOVXU) that may perform globally observed loads and stores even though the hardware transaction's implicitly transactional access monitoring and buffering has been left in effect within the inner open nested atomic transaction.

Detailed Examples of Some Embodiments that may be Implemented

Some embodiments described herein implement a system whereby hardware acceleration of transactions can be accomplished by implementing open nested transaction in hardware which respect software locks such that a top level transaction can be implemented in software, and thus not be limited by hardware constraints typical when using hardware transactional memory systems.

Some embodiments implement an overall-high performance unbounded transactional memory system with rich semantics, to go beyond what can be achieved with a bounded hardware transactional memory, including allowing fast cache resident transactions to execute alongside software transactional memory transactions (even those on software threads that are not scheduled to cores).

Some embodiments may be able to scalably execute concurrent unbounded transactions, and/or to leverage bounded cache resident hardware transactional memory hardware to do so even much more efficiently than is possible in a pure software implementation.

Hardware transactional memory solutions may be implemented using cache memory. Referring now to FIG. 1A, an example environment is illustrated. FIG. 1A illustrates a plurality of processors 102-1-102-3. When referred to generically herein, the processors may be referred to simply as processor 102. In fact any component referred to using a specific appendix designator may be referred to generically without the appendix designator, but with a general designator to which all specific examples belong. Each of the processors implements one or more threads (referred to generically as 104). In the present example, each of the processors 102-1-102-3 supports a single thread 104-1-104-3 respectively. However, embodiments may be implemented where processors support multiple threads. Each of the threads 104-1-104-3 includes an instruction pointer 106-1-106-3, general registers 108-1-108-3, and special registers 110-1-110-3. Each of the special registers 110-1-110-3 includes a transaction control register (TCR) 112-1-112-3 and a transaction status register (TSR) 114-1-114-3. The functionality of these registers will be explained in more detail below in conjunction with the description of FIG. 1B.

Reference once again to FIG. 1A further illustrates that connected to each processor is a level 1 data cache (L1D$) 116-1, 116-2 and 116-3. Details of a L1D$ are now illustrated with reference to FIG. 1B. FIG. 1B illustrates that a L1D$ 116 includes a tag column 118 and a data column 120. The tag column 118 typically includes an address column 122 and a MESI column 124. The MESI indicator is used for implementing the Illinois MESI protocol and indicates a state of data in a cache line. MESI stands for the modified (or dirty), exclusive, shared and invalid states respectively. Because in a cache hierarchy there may be several different copies of a particular piece of data, an indicator is used to indicate the state and sharing of data at a particular location. If the indicator indicates that the data is modified, that means that the data at that location was modified by an agent at that location and no other agents have a cached copy of the data. If the indicator indicates that data is exclusive, this means that no other agents have a cached copy of the data. If the indicator indicates that the data is shared, this means that other agents may share the same version of the data. If the data is indicated as invalid, then the data at the current location is invalid and will not be used.

In a cache-coherent multiprocessor, a level of data cache that is logically private to one processor (usually level one data cache (L1D$)) may be extended with additional MESI states and behavior to provide cache coherence based detection of conflicting data accesses from other agents, and to locally buffer speculative writes in a private cache such that other agents in the system do not observe speculatively written data until the data's state transitions from speculatively written to globally observed.

The address column 122 includes a physical address for data stored in the data column 120. In particular, as illustrated in FIG. 1A, a computing system generally includes system memory 126. The system memory may be, for example semiconductor based memory, one or more hard-drives and/or flash drives. The system memory 126 has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture.

FIG. 1B further illustrates details of the transaction status register 112 included in the hardware threads 104. The transaction status register 112 accumulates events related to the read monitor indicator, the write-monitor indicator, and the buffer monitor indicator. In particular, the transaction status register 112 includes an entry 134 to accumulate a loss of read monitor, an entry 136 to accumulate a loss of write monitor, and an entry 138 to accumulate a loss of buffering.

Illustrating now an example, a software designer may code instructions that when executed by the thread 104-1 cause a read monitor indicator to be set for a memory block. If another thread writes to an address in the monitored memory block, such a conflicting access causes the read monitor indicator to be reset, and accumulates in the loss of read monitor entry 134. A similar case applies when a write monitor indicator is set, and another thread reads or writes to an address in the monitored memory block, causing the write monitor to be reset, and accumulates in the loss of write monitor entry 136.

FIG. 1B illustrates further details of the transaction control register 114. The transaction control register 114 includes entries defining actions that should occur on the loss of read monitor, write-monitor, and/or buffering. In particular, the transaction control register 114 includes an entry 140 that indicates whether or not a transaction should be aborted on the loss of the read monitor, an entry 142 that indicates whether or not a transaction should be aborted on the loss of the write monitor, and an entry 146 that indicates if the transaction should be aborted on the loss of buffering. Abort is implemented by a hardware control transfer (jump) to a software abort handler.

For example, and continuing with the example above where a software designer has coded instructions that when executed by the thread 104-1 cause a read monitor indicator to be set for a memory block, if another thread writes to an address in the memory block, in addition to noting such access in the read monitor entry 134, the read monitor indicator in the read monitor column 128 may be reset.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
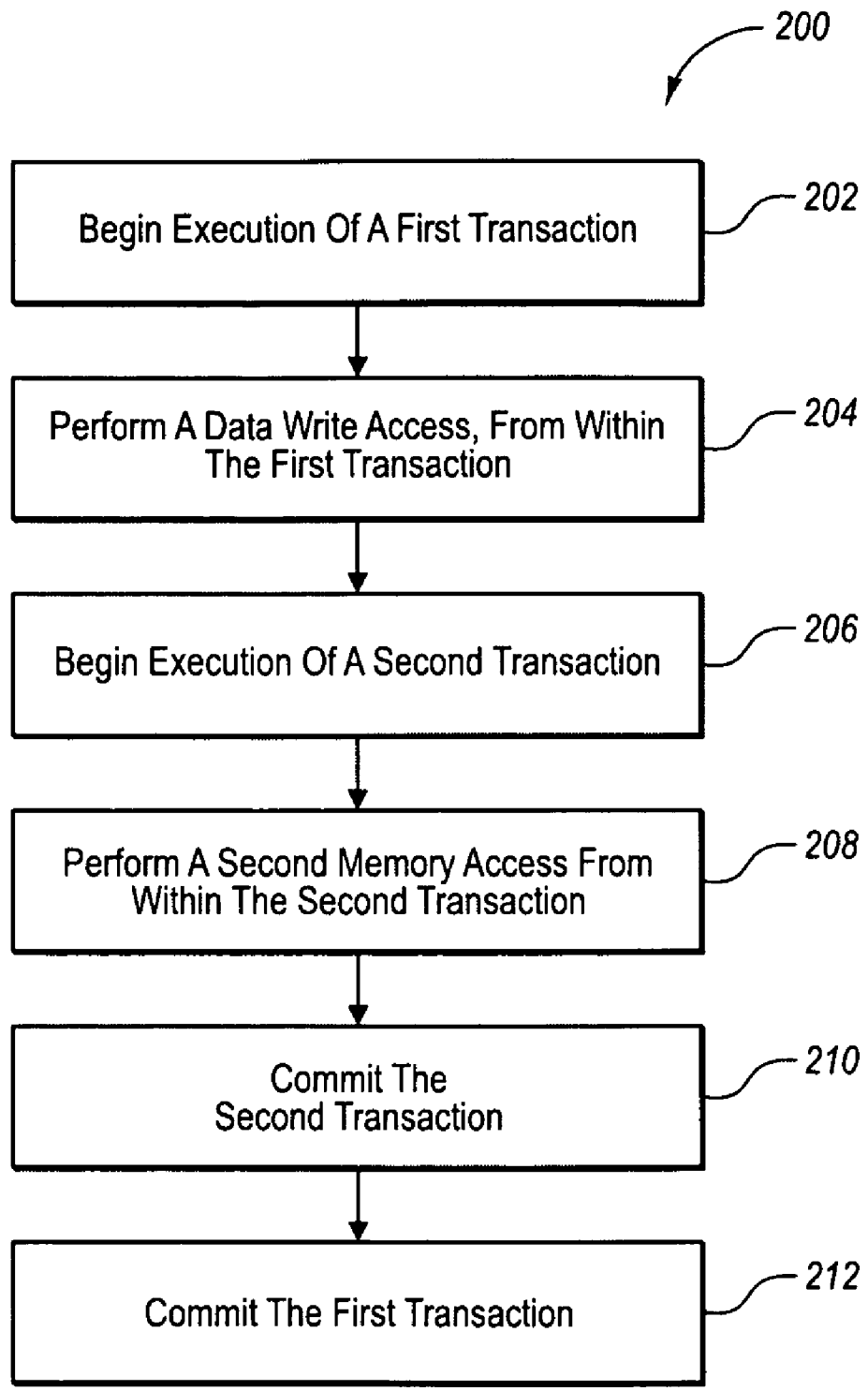
FIG. 2 illustrates a method of implementing hardware assisted transactional memory.

Referring now to FIG. 2, a method 200 is illustrated. The method 200 may be practiced in a computer system to implement a hardware assisted transactional memory system. In the example illustrated, the method 200 includes performing the following acts at a single thread. The method 200 includes beginning execution of a first transaction (act 202). The method 200 further includes, then performing a data write access, from within the first transaction (act 204). The data write access includes establishing a software visible indication that the data is being written. The indication is correlated to the data that is being written. The data write access further includes performing a write to memory. For example, the software visible indication may include one or more of a software transactional memory lock indicator for the accessed data, a software transactional memory version indicator, or a software transactional memory timestamp indicator, or the TMW transactional metadata word for the data item described above.

The method 200 further includes then beginning execution of a second transaction (act 206). This may include executing processor level instructions to establish a hardware transactional execution mode on the thread. For example, a specialized processor instruction set architecture (ISA) may include instructions to begin a hardware supported transaction.

The method 200 further includes then performing a second memory access from within the second transaction (act 208). For example, a specialized processor instruction set architecture may include instructions to including executing processor level instructions to establish at least one of hardware conflict detection or speculative write buffering on the data.

The method 200 further includes, then committing the second transaction (act 210). This may include executing processor level instructions to exit the transaction and commit any speculatively buffered writes to become permanent and globally observed. For example, committing execution may include executing the TXCOM instruction described above.

The method 200 further includes then committing the first transaction (act 212).

The method 200 may be performed where performing a second memory access from within the second transaction further includes performing the memory access in a way that is compatible with software transactional memory conflict detection and data versioning. In particular, even though the second transaction may be a hardware based transaction, a TM system may nonetheless include functionality for complying with and/or respecting software transactional locks. The example of a CRISTM execution mode illustrated above may include such functionality.

Illustrating now one such example, the method 200 may be performed where performing a second memory access from within the second transaction further includes performing the memory access by testing at least one of a software transactional memory lock indicator for the accessed data, a software transactional memory version indicator, or a software transactional memory timestamp indicator to detect a data access conflict with the first transaction or any other transaction.

In a similar example, the method 200 may be performed where performing a second memory access that is a data write access from within the second transaction further includes setting a least one of a software transactional memory lock indicator for the accessed data, a software transactional memory version indicator, or a software transactional memory timestamp indicator to incur an eventual data access conflict with a conflicting software transaction.

The method 200 may be performed where beginning execution of a second transaction includes selecting a hardware transactional execution mode from among a set of hardware transactional execution modes and software transactional execution modes. For example, in embodiments other than that illustrated by the method 200, the second transaction may be performed using HASTM, CRISTM, CRESTM, and/or purely in a software transactional execution mode. However, in the example illustrated in FIG. 2, the transaction is performed using a hardware transactional execution mode selected from among the hardware and software transactional execution modes.

Various actions may be used to determine what transactional execution mode to select. In one embodiment, selecting the transactional execution mode from among a set of transactional execution modes is performed based on reference to one or more statically defined indicators. For example, the results of a static analysis of statements, expressions, and/or memory accesses within an atomic block may be used to determine whether or not a hardware or software transactional execution mode should be used. Such analysis may be performed such that the one or more statically defined indicators are a function of a given transaction begin site, the function depending on the particular site or the caller of that site. For example, it may be known or suspected that transactions that are begun as a result of a call from a particular caller site will likely fail in hardware modes because the transaction may be too large. Thus, the statically defined indicators may specify that software transactions be used for such transactions.

Embodiments may alternatively or additionally be used which select a transactional execution mode from among a set of hardware transactional execution modes and software transactional execution modes based on reference to a one or more dynamically computed indicators. For example, the one or more dynamically computed indicators may be a function of the history of past transactional execution modes and outcomes, for a given site. The history may be generated by a transactional memory system. For example, a transactional memory system may maintain per atomic block commit and abort counters and increment one or the other as transactions commit or abort. The history of past transactional execution modes and outcomes may be used as feedback to select a hardware transactional execution mode. For example, it may be observed by a transactional memory system that certain callers, or certain atomic blocks often result in the transaction failing in hardware transactional execution modes. In future invocations of transactions, calls to begin performing a transaction will be executed using software transactions to prevent or minimize the likelihood of a transaction failing. Thus, these dynamic observations may be used to select transactional modes.

The method 200 may be performed where selecting a transactional execution mode from among a set of hardware transactional execution modes and software transactional execution modes is performed based on a number of factors combined. For example, reference to a one or more statically defined indicators, reference to a one or more dynamically computed indicators, and reference to at least one of system load or transactional memory system throughput statistics may be used together.

Figure 3:
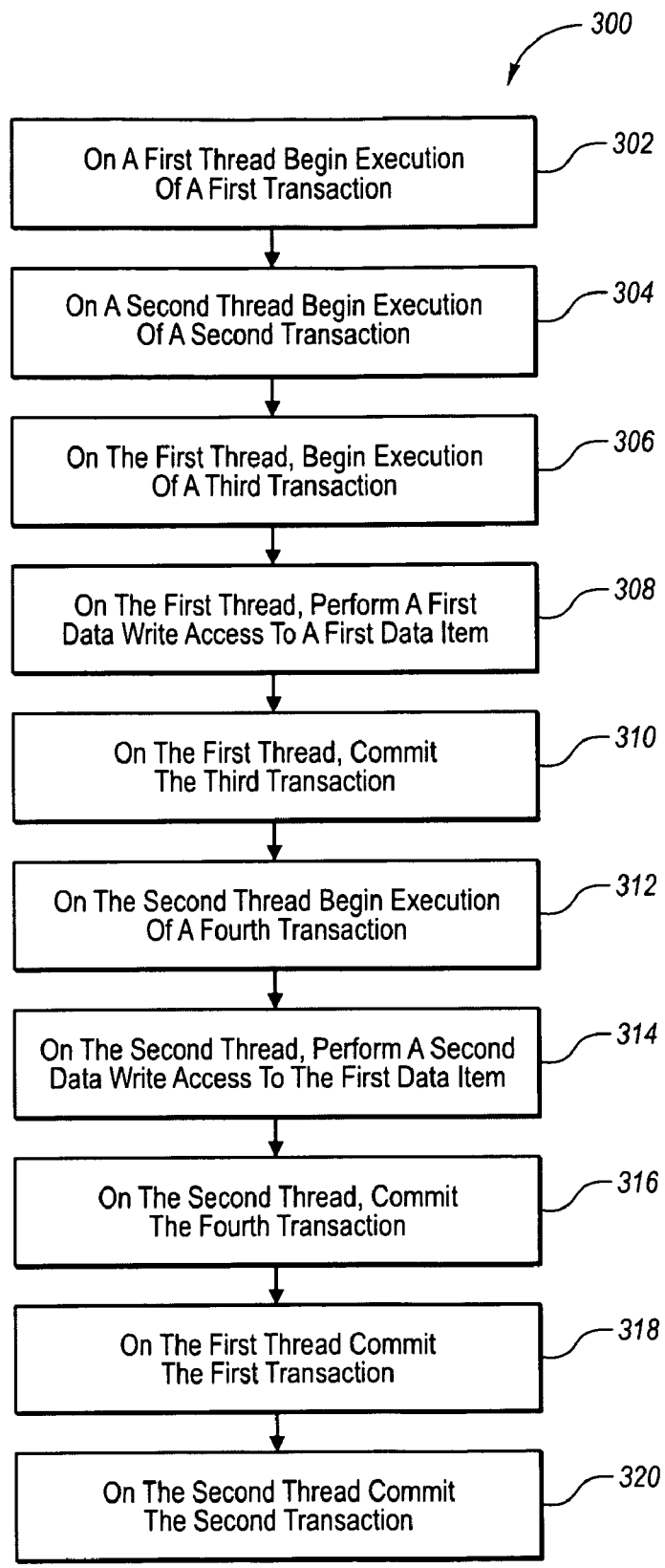
FIG. 3 illustrates another method of implementing hardware assisted transactional memory.

Referring now to FIG. 3, a method 300 is illustrated. The method may be practiced in a computer system to implement a transactional memory system including a plurality of threads.

The method 300 includes, on a first thread beginning execution of a first transaction (act 302). The method 300 further includes then on a second thread beginning execution of a second transaction (act 304). The method 300 further includes then on the first thread, beginning execution of a third transaction (act 306). The third transaction is a first nested transaction nested in the first transaction. For example, it may be an open nested transaction as described above.

The method 300 further includes then on the first thread, performing a first data write access to a first data item (act 308). The method 300 further includes then on the first thread, committing the third transaction (act 310). In some embodiments, the first data write is committed and becomes globally observed, and the read and write sets of the first transaction do not include this memory access to the first data item, nor does the first transaction acquire a transactional write lock on the first data item.

The method 300 further includes then on the second thread beginning execution of a fourth transaction (act 312). The fourth transaction is a second nested transaction, nested in the second transaction. For example, it may also be an open nested transaction as described above.

The method 300 further includes then on the second thread, performing a second data write access to the first data item (act 314). The method 300 further includes then on the second thread, committing the fourth transaction (act 316). In some embodiments, the second data write is committed and becomes globally observed, and the read and write sets of the second transaction do not include this memory access to the first data item, nor does the second transaction acquire a transactional write lock on the first data item.

The method 300 further includes then in either order, on the first thread committing the first transaction (act 318) and on the second thread committing the second transaction (act 320).

The method 300 may be practiced where at least one of the first data write access or the second data write access includes executing processor level instructions to establish at least one of hardware conflict detection or speculative write buffering on the data. For example specialized instructions included in an instruction set architecture may be used. For example, in implicit transactional mode such as CRISTM, as described above, a load of the TMW may implicitly set read monitoring on the TMW, or a store of the new version number of the data into the TMW may implicitly set write monitoring and buffering on the TMW. Or for example, an explicit TM mode such as CRESTM as described above may execute an explicit load and set read monitoring instruction (such as MOVXM illustrated above), or an explicit store and set write buffering instruction (such as MOVXB illustrated above), to test or update the TMW respectively.

The method 300 may be practiced where the first data write access and the second data write access include executing processor level instructions to establish at least one of hardware conflict detection or speculative write buffering on the data. In some examples of this embodiment, the method 300 may be practiced where at least one of the first data write access or the second data write access includes performing the memory access by testing at least one of a software transactional memory lock indicator for the accessed data, a software transactional memory version indicator, or a software transactional memory timestamp indicator to detect a data access conflict with any other transaction.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method in a computer system to implement a hardware assisted transactional memory system comprising at a single thread:
   beginning execution of a first transaction;
   then performing a data write access, from within the first transaction, wherein the data write access, comprising establishing a software visible indication that the data is being written correlated to the data that is being written and performing a write to memory;
   then, beginning execution of a second transaction, comprising executing processor level instructions to establish a hardware transactional execution mode on the thread, and wherein beginning execution of a second transaction comprises selecting a hardware transactional execution mode from among a set of hardware transactional execution modes and software transactional execution modes based on:
      reference to a one or more statically defined indicators, wherein the one or more statically defined indicators are a function of a given transaction begin site, the function depending on the particular site or the caller of that site;
      reference to a one or more dynamically computed indicators, wherein the one or more dynamically computed indicators are a function of the history of past transactional execution modes and outcomes, for a given site, wherein the history is generated by a transactional memory system, the history of past transactional execution modes and outcomes being used as feedback; and
      reference to at least one of system load or transactional memory system throughput statistics;
   then performing a second memory access from within the second transaction, including executing processor level instructions to establish at least one of hardware conflict detection or speculative write buffering on the data;
   then committing the second transaction, including executing processor level instructions to exit the transaction and commit speculatively buffered writes to become permanent and globally observed;
   then committing the first transaction.

2. The method of claim 1 wherein performing a second memory access from within the second transaction further comprises performing the memory access in a way that is compatible with software transactional memory conflict detection and data versioning.

3. The method of claim 2, wherein performing a second memory access from within the second transaction further comprises performing the memory access by testing at least one of a software transactional memory lock indicator for the accessed data, a software transactional memory version indicator, or a software transactional memory timestamp indicator to detect a data access conflict with the first transaction or any other transaction.

4. The method of claim 2, wherein performing a second memory access that is a data write access from within the second transaction further comprises setting a least one of a software transactional memory lock indicator for the accessed data, a software transactional memory version indicator, or a software transactional memory timestamp indicator to incur an eventual data access conflict with a conflicting software transaction.

5. The method of claim 1, wherein selecting a hardware transactional execution mode from among a set of hardware transactional execution modes and software transactional execution modes is performed based on reference to a one or more statically defined indicators.

6. The method of claim 5, wherein the one or more statically defined indicators are a function of a given transaction begin site, the function depending on the particular site or the caller of that site.

7. The method of claim 1, wherein selecting a hardware transactional execution mode from among a set of hardware transactional execution modes and software transactional execution modes is performed based on reference to a one or more dynamically computed indicators.

8. The method of claim 7, wherein the one or more dynamically computed indicators are a function of the history of past transactional execution modes and outcomes, for a given site, wherein the history is generated by a transactional memory system, the history of past transactional execution modes and outcomes being used as feedback to select a hardware transactional execution mode.

9. A computer program product for implementing a hardware assisted transactional memory, the computer program product comprising one or more physical storage devices having instructions encoded thereon which, when executed upon one or more computer processors causes the processors to perform, at a single thread, the method of claim 1.

10. A system for implementing hardware assisted transactional memory, the system comprising one or more computer processors and one or more computer readable storage devices having instructions encoded thereon which, when executed upon the one or more computer processors causes the processors to perform, at a single thread, the method of claim 1.

* * * * *